(12) United States Patent
Zhou (10) Patent No.: US 8,459,556 B2
(45) Date of Patent: Jun. 11, 2013

(54) PRIORITIZED VIRTUAL SCAN LINE PROCESSING

(75) Inventor: Weiyang Zhou, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 782 days.

(21) Appl. No.: 12/652,544

(22) Filed: Jan. 5, 2010

(65) Prior Publication Data

US 2010/0177363 A1    Jul. 15, 2010

Related U.S. Application Data

(60) Provisional application No. 61/143,651, filed on Jan. 9, 2009.

(51) Int. Cl.
*G06K 7/10* (2006.01)

(52) U.S. Cl.
USPC ............. 235/462.07; 235/462.09; 235/462.41

(58) Field of Classification Search
USPC ............ 235/462.07, 462.09, 462.41; 382/181
See application file for complete search history.

(56) References Cited

U.S. PATENT DOCUMENTS

| | | | |
|---|---|---|---|
| 5,298,728 A | 3/1994 | Elliott et al. | |
| 5,304,787 A * | 4/1994 | Wang | 235/462.09 |
| 5,371,361 A | 12/1994 | Arends et al. | |
| 5,446,271 A | 8/1995 | Cherry et al. | |
| 5,463,211 A | 10/1995 | Arends et al. | |
| 5,478,997 A | 12/1995 | Bridgelall et al. | |
| 5,493,108 A | 2/1996 | Cherry et al. | |
| 5,635,699 A | 6/1997 | Cherry et al. | |
| 5,929,421 A | 7/1999 | Cherry et al. | |
| 6,142,376 A | 11/2000 | Cherry et al. | |
| 6,155,488 A | 12/2000 | Olmstead et al. | |
| 6,371,371 B1 | 4/2002 | Reichenbach | |
| 6,513,714 B1 | 2/2003 | Davis et al. | |
| 6,561,427 B2 | 5/2003 | Davis et al. | |
| 6,585,157 B2 * | 7/2003 | Brandt et al. | 235/462.07 |
| 6,678,412 B1 * | 1/2004 | Shigekusa et al. | 382/181 |
| 6,827,273 B2 | 12/2004 | Wilz, Sr. et al. | |
| 6,877,663 B2 | 4/2005 | Kelly et al. | |
| 6,969,004 B2 | 11/2005 | Ralph et al. | |
| 6,981,644 B2 | 1/2006 | Cheong et al. | |
| 7,299,975 B2 | 11/2007 | McQueen et al. | |
| 7,398,927 B2 | 7/2008 | Olmstead et al. | |

(Continued)

FOREIGN PATENT DOCUMENTS

| | | |
|---|---|---|
| JP | 08137983 | 5/1996 |
| KR | 1020010044743 | 6/2001 |
| WO | WO 2006/049430 A1 | 5/2006 |

*Primary Examiner* — Daniel Hess
(74) *Attorney, Agent, or Firm* — Stoel Rives LLP (57) ABSTRACT

Systems and methods are provided for prioritizing an order in which to process a plurality of sub-regions of an acquired image of an optical code. A method of processing an optical code in a data reader comprises the steps of receiving data corresponding to a plurality of sub-regions of an acquired image of an optical code, processing according to a processing order the plurality of sub-regions for decodable data corresponding to the optical code, determining based on the step of processing the plurality of sub-regions whether one or more of the plurality of sub-regions contains decodable data, and if it is determined that a sub-region contains decodable data, increasing the processing priority associated with said sub-region. If one or more of the sub-regions having the highest processing priority contains decodable data, the remaining sub-regions do not need to be processed, which may save processing resources and increase the read throughput.

25 Claims, 5 Drawing Sheets

U.S. PATENT DOCUMENTS

| | | |
|---|---|---|
| 7,743,994 B2 | 6/2010 | Actis |
| 2003/0127518 A1 | 7/2003 | Park et al. |
| 2003/0218069 A1 | 11/2003 | Meier et al. |
| 2004/0004128 A1* | 1/2004 | Pettinelli et al. ......... 235/462.41 |
| 2005/0077358 A1 | 4/2005 | Boehm et al. |
| 2005/0116044 A1 | 6/2005 | Zhu et al. |
| 2005/0274809 A1 | 12/2005 | Colley |
| 2006/0027657 A1 | 2/2006 | Ninnink et al. |
| 2006/0081712 A1 | 4/2006 | Rudeen et al. |
| 2006/0108424 A1 | 5/2006 | Kim et al. |
| 2006/0278708 A1 | 12/2006 | Olmstead |
| 2006/0278712 A1 | 12/2006 | Olmstead |
| 2008/0169347 A1 | 7/2008 | Olmstead |

* cited by examiner

PRIORITIZED VIRTUAL SCAN LINE PROCESSING

RELATED APPLICATIONS

This application claims the benefit under 35 U.S.C. §119(e) of U.S. Provisional Application No. 61/143,651, filed Jan. 9, 2009, which is hereby incorporated by reference in its entirety.

TECHNICAL FIELD

The field of the present disclosure relates generally to data readers and, in particular, to prioritizing an order in which to decode a plurality of sub-regions, such as virtual scan lines, of an acquired image of a scan volume that may contain an optical code.

BACKGROUND INFORMATION

Optical codes have widespread applications. For example, optical codes can be used to identify a class of objects (e.g., merchandise) or unique items (e.g., patents). As a result, optical codes are found on a wide variety of objects, such as goods, company assets, and documents, and help track production at manufacturing facilities and inventory at stores (by scanning items as they arrive and as they are sold).

An optical code is essentially a machine-readable representation of information in a visual format on a surface of the object (i.e., a barcode). Some optical codes use a dark ink on a white substrate to create high and low reflectance upon scanning. Based on the symbology being used (e.g., UPC, Code 39, Code 128, and PDF417), an optical code may comprise data characters (or codewords in the case of, e.g., PDF417) and/or overhead characters represented by a particular sequence of bars and spaces (which may have varying widths).

Optical code readers are used to capture optical codes or other symbols or information imprinted on various surfaces in order to transmit the information encoded in the optical code or symbol to a host processing device. Two types of commonly used optical code readers are flying spot scanners and imaging based scanners. Flying spot laser scanners generally obtain optical code information by sweeping a laser spot across the optical code. The laser spot may be generated by a laser light source which is then directed towards an oscillating reflecting surface, typically a mirror. The light reflected from the optical code is collected by a photosensor, which outputs an analog waveform representing the relative spacing of the bars in the optical code. The analog signal may then be digitized and decoded into data representing the information encoded in the optical code.

Imaging based scanners include solid state image circuitry, such as charge coupled devices (CCDs) and complementary metal-oxide semiconductor (CMOS) devices, and may be implemented using a one-dimensional or two-dimensional imaging array of photosensors (or pixels) to capture the optical code. One-dimensional CCD readers capture a linear cross section of the optical code, producing an analog waveform whose amplitude represents the relative darkness and lightness of the optical code. Two-dimensional CCD readers capture an entire two-dimensional image. Generally only select portions of the image data are stored and processed. The select portions of the image data are sometimes referred to as virtual scan lines because the select portions are analogous to a signal generated by reflection of a moving laser beam spot scanning across the optical code.

Traditionally, imaging systems that process captured images using sub-regions, such as virtual scan lines, process each sub-region indiscriminately. Even though only certain sub-regions will be at least partially coincident on an optical code (and therefore contain decodable data), each sub-region consumes approximately the same amount of computing resources. Thus, computing resources may be wasted processing sub-regions having a low likelihood of containing decodable data. Accordingly, the present inventor has identified a need to prioritize an order in which to process the sub-regions for decodable data so that sub-regions that are most likely to contain decodable data are processed first.

DETAILED DESCRIPTION OF EMBODIMENTS

With reference to the above-listed drawings, this section describes particular embodiments and their detailed construction and operation. The embodiments described herein are set forth by way of illustration only. In light of the teachings herein, those skilled in the art will recognize that there may be equivalents to what is expressly or inherently taught herein. For example, variations can be made to the embodiments described herein and other embodiments are possible. It is not always practical to exhaustively catalog all possible embodiments and all possible variations of the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Overview

Before describing detailed examples of prioritized sub-region processing, a representative data reader and associated concepts will first be described.

Figure 1:
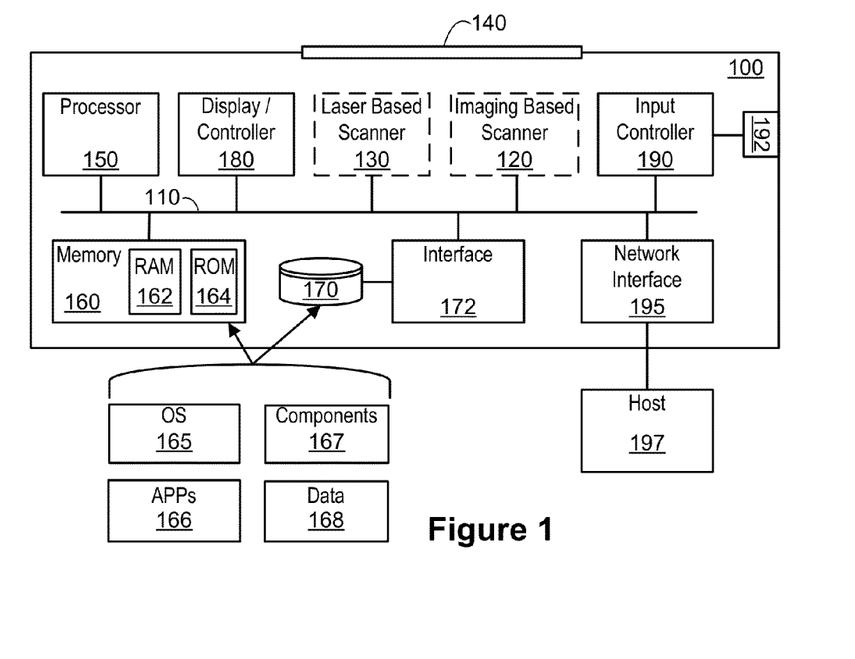
FIG. 1 is a block diagram of a scanner system including an imaging based scanner, according to one embodiment.

FIG. 1 is a block diagram showing operational components of a data reader or scanner or scanning system 100, according to one embodiment. While a bus-based architecture, based on a bus 110, is illustrated in FIG. 1, other types of architectures are also suitable. For example, one or more of the components may be directly coupled to each other. The scanner system 100 may incorporate any number of data readers, such as an imaging based scanner 120, a laser based scanner 130, or both. The imaging based scanner 120 and laser based scanner 130 attempt to read encoded symbols through a window 140.

Other positions or configurations of the scanners may be employed. For example, the scanner system 100 may include only an imaging based scanner 120, only a laser based scanner 130, or an imaging based scanner 120 and a laser based scanner 130. Additionally, the scanner system 100 may comprise a multi-window scanner, such as a two-window scanner sometimes referred to as a bioptic scanner, including a lower window arranged in a generally horizontal plane and an upper window arranged in a generally vertical plane with imaging based scanners, laser based scanners, or both, attempting to read encoded symbols through the windows.

The scanner system 100 may include any number of other components that interface with one another via the bus 110, including a processor 150, memories 160 and 170, a display controller and display device 180, an input controller 190, and a network interface 195. Other versions of the scanner system 100 may omit one or more of these components, may contain additional components, or both. The processor 150 may be any commercially available processor or other logic machine capable of executing instructions, such as a general-purpose microprocessor or a digital signal processor (DSP). Additionally, more than one processor may be provided. The processor 150 may be readily programmable; hard-wired, such as an application specific integrated circuit (ASIC); or programmable under special circumstances, such as a programmable logic array (PLA) or field programmable gate array (FPGA), for example. Program memory for the processor 150 may be integrated within the processor 150, may be part of the memory 160 or 170, or may be an external memory. The processor 150 executes one or more programs to control the operation of the other components, to transfer data between the other components, to associate data from the various components together (preferably in a suitable data structure), to perform calculations using the data, to otherwise manipulate the data, and to present results to the user. For example, the processor 150 preferably executes a sub-region prioritization algorithm that prioritizes an order in which various sub-regions of an acquired image are processed based on a likelihood that each sub-region will contain decodable data. Additional details of prioritized sub-region procession will be discussed in more detail below.

The display controller and display device 180 may optionally be provided to present data, menus, and prompts, and otherwise communicate with the user via one or more display devices, such as a transmissive or reflective liquid crystal display (LCD), cathode ray tube (CRT) display, or other suitable display.

The standard input controller 190 may be configured to receive user input from a keyboard, a pointing device, or other wired/wireless input devices. According to one embodiment, the input controller 190 comprises a universal interface driver application specific integrated circuit (UIDA). Further details of the UIDA can be found in U.S. Pat. No. 6,877,663, which is hereby incorporated by reference in its entirety. Other input devices may be included, such as a microphone, touchscreen, touchpad, and trackball. While the input devices may be integrated into the scanner system 100 and coupled to the processor 150 via the input controller 190, input devices may also connect via other interfaces, such as a connector 192. The connector 192 may include one or more data interfaces, bus interfaces, wired or wireless network adapters, or modems for transmitting and receiving data. Accordingly, the input controller 190 may include one or more of hardware, software, and firmware to implement one or more protocols, such as stacked protocols along with corresponding layers. Thus, the connector 192 may function as one or more of a serial port (e.g., RS232), a Universal Serial Bus (USB) port, and an IR interface. The input controller 190 may also support various wired, wireless, optical, and other communication standards.

The network interface 195 may be provided to communicate with one or more hosts 197 or other devices (e.g., a computer or a point-of-sale terminal). For example, data gathered by, or decoded by, the image based scanner 120 or laser based scanner 130 may be passed along to the host computer 197. The host computer 197 may present data, prompts, and otherwise communicate with the user via one or more display devices. For example, the computer may present the decoded data to the user via a display, such as the object type (e.g., product type) corresponding to the scanned barcode and data associated with the object type (e.g., a price of the product). The data associated with the object type may be encoded in the barcode or accessed from a local or remote database based upon the object type. By way of another example, the host computer 197 may cause the decoded data to be recorded on a tangible medium. For example, the host computer 197 may instruct a printer to print the object type and data corresponding to the object type (e.g., print the product type and associated price on a receipt). The host computer 197 may be any machine that manipulates data according to a list of instructions (e.g., a point-of-sale terminal or any hardware/software used where a transaction takes place, such as a checkout counter in a shop). For example, the host computer 197 may comprise a mobile device, server, personal computer, or embedded computer. The network interface 195 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (PCMCIA), and USB. A wireless connection may use low or high powered electromagnetic waves to transmit data using any wireless protocol, such as Bluetooth™, IEEE 802.11b (or other WiFi standards), infrared data association (IrDa), and radiofrequency identification (RFID).

The scanner system 100 may include memory 160, which may be implemented using one or more standard memory devices. The memory devices may include, for instance, RAM 162, ROM 164, and EEPROM devices, and may also include magnetic or optical storage devices, such as hard disk drives, flash memory, CD-ROM drives, and DVD-ROM drives. The scanner system 100 may also include an interface 172 coupled to an internal hard disk drive 170. In addition, the interface 172 may also be coupled to a magnetic disk drive, an optical disk drive, or another drive and may be configured for external drive implementations, such as over a USB, IEEE 1194, or PCMCIA connection.

According to one embodiment, any number of program modules are stored in the drives (e.g., drive 170) and ROM 164, including an operating system (OS) 165, one or more application programs 166, other program modules 167 (e.g., instructions to implement the methods described below), and data 168. All or portions of the program modules may also be cached in RAM 162. Any suitable operating system 165 may be employed. One of the program modules 167 may comprise a set of instructions to implement the prioritized sub-region processing described in more detail below.

Other versions of the scanner system 100 may have less than all of these components, may contain other components, or both. In a preferred implementation, the scanner system 100 comprises a fixed scanner, such as a Magellan® scanner manufactured by Datalogic Scanning, Inc. of Eugene, Oreg. The scanner system 100 may also comprise other types of scanners, such as a portable scanner.

Figure 2:
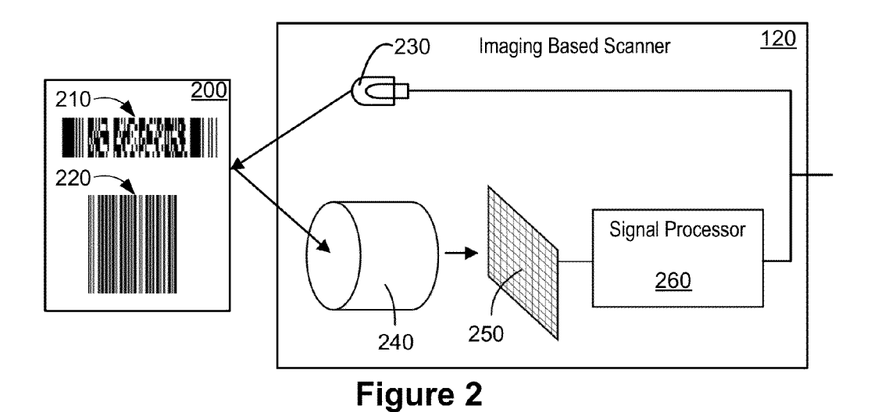
FIG. 2 is a block diagram of the imaging based scanner of FIG. 1.

FIG. 2 is diagram of an imaging based scanner 120 for forming an image of an item or object 200, according to one embodiment. The object 200 may be any object, but in one preferred use, the object 200 is an item upon which is printed an optical code, such as barcode 210 (PDF417) and barcode 220 (Code 128). The imaging based scanner 120 comprises an illumination source 230, a lens assembly 240, an imager 250, and a signal processor 260. The imaging based scanner 120 may comprise other components not illustrated or may omit certain components illustrated, such as the illumination source 230 and thus rely on ambient light. The illumination source 230 may comprise any suitable source of light, such as a row of light emitting diodes (LEDs), flash strobes, or incandescent or fluorescent lamps.

The lens assembly 240 may comprise one or more lenses for focusing light on imager 250. For example, the lens assembly 240 may comprise a single optical element or may comprise an array of optical elements with a common axis. The lens assembly 240 may also comprise a zoom lens coupled to the processor 150 to control an amount of optical zoom. The imager 250 forms an electronic image of the object 200. The imager 250 may comprise a wide range of image sensing devices for converting an optical image (or another wave in the electromagnetic spectrum) into an electrical signal. For example, the imager 250 may be a digital camera, such as a charge-coupled device (CCD) camera or complimentary metal-oxide semiconductor (CMOS) camera, both of which form a one-dimensional or two-dimensional array of pixels, which together constitute an electronic representation of the image. Each pixel location stores data indicative of the light intensity at that location of the image. The light intensity data for each pixel may be a color-coded vector (e.g., red-green-blue) or monochrome intensity (e.g., grayscale).

After the imager 250 has been exposed to light reflected by the object 200, data from all the pixels can be sequentially read out in a selectable pattern (which may be row-by-row, column-by-column, or some other pattern). The signal processor 260 conditions the data received from the imager 250 and may generate an output that generally identifies which regions of the image correspond to light areas, and which correspond to dark areas. For example, the signal processor 260 may set the exposure time and thresholding so that the bars or relatively darker regions of the barcode or other target are reported as being dark, and the spaces or relatively lighter regions between the bars or darker regions are reported as being light, according to any of a number of techniques. Either analog or digital signal processing may be utilized in the signal processor 260. While the imager 250 and the signal processor 260 may be contained in the same integrated circuit, other configurations are possible. For example, the signal processor 120 may be implemented by the processor 150 (FIG. 1) or one or more other logic machines capable of executing instructions.

Figure 3:
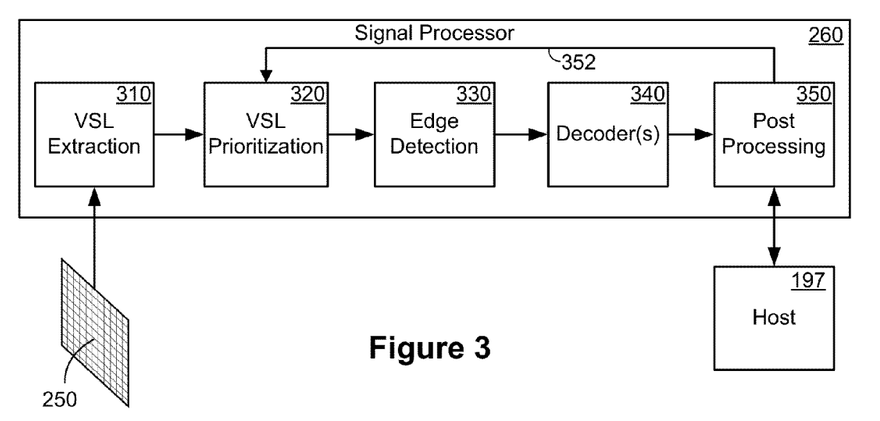
FIG. 3 is a block diagram illustrating a signal processor implementing or executing various components or modules, according to one embodiment.

FIG. 3 is a block diagram illustrating a signal processor implementing or executing various components or modules, according to one embodiment. Preferably, only a select portion or sub-region of the image data captured by the imager 250 corresponding to one or more sub-regions is processed for decodable data. Optionally, the select portion or sub-region may be stored in a memory, such as memories 160 or 170. According to one embodiment, all of the image data captured by the imager 250 may be used to search for and decode a barcode. The signal processor 260 may include or execute a sub-region or virtual scan line extraction module 310 to read or assemble samples or pixels from the imager 250. According to one embodiment, the samples or pixels lie along one or more lines or other defined paths across the image at arbitrary angles with respect to one another or in another desired scan pattern. For example, the extraction module 310 may compute coordinates for one or more straight lines using raster-based line drawing algorithms, such as the Bresenham line drawing algorithm, and select pixels from the imager 250 along such lines. Similarly, coordinates for curved lines, such as quadratic lines, can be computed with second order difference techniques, as also described by Bresenham. The sub-region extraction module 310 may define and map sub-regions onto a raster pattern, thereby allowing the pixels of the raster which fall on the sub-regions to be identified and processed for decodable data, and possibly stored for later use or processing. Storing only a select portion of the image data corresponding to sub-regions reduces the total amount of data that needs to be stored and processed. While the extraction module 310 may extract data corresponding to virtual scan lines, the extraction module 310 may extract data corresponding to other regions or sub-regions of the image for use in decoding, such as the rectilinear shaped sub-regions 410A through 410Q illustrated in FIG. 4C.

According to a preferred embodiment, the signal processor 260 includes or executes a prioritization module 320. As will be described in more detail below, the prioritization module 320 determines an order in which to process the data associated with each sub-region for decodable data (e.g., an order in which to attempt to decode the data associated with each sub-region). Preferably, the sub-regions are processed according to a processing order, which defines an order in which to process the sub-regions such that a sub-region having a highest priority is processed first. Each sub-region may have associated therewith a processing priority or an indication of a likelihood of decoding each of the sub-regions with respect to the other sub-regions. For example, based on a prioritization scheme or a priority or prioritization list indicating the order in which sub-regions should be processed, the sub-regions having the highest priority are processed first. According to a preferred embodiment, the prioritization scheme is loaded from memory (e.g., memory 160 or drive 170) upon initialization of the scanner system 100 (e.g., when the scanner system 100 is powered-up or reset) and is updated as the scanner system 100 decodes optical codes. Additional details of various methods and algorithms used to implement the prioritization module 320 will be described in more detail below. The prioritization module 320 may comprise hardware or firmware. Additionally or alternatively, the prioritization module 320 comprises software or a set of instructions stored in a memory, such as memories 160 and 170.

The signal processor 260 may also include or execute an edge detection module 330 that identifies edge transition locations in the extracted data using any suitable edge detection technique. For example, after an image of the object 200 has been captured by the imager 250, the image may be represented by a certain number of pixels, each of which is represented by a certain value. For a grayscale image where each pixel is represented by 8 bits, each pixel may have a value ranging from 0 (black) to 255 (white) with various shades of gray between 0 and 255. While the image may be a grayscale image, it may also be a color image or a black-and-white image. Additionally, while each pixel may be represented by 8 bits, a pixel may be represented by any number of bits (e.g., 10 bits or 12 bits). Further, while the following discussion refers to the entity under analysis as a pixel, the entity under analysis may also be a group of pixels or a sub-region of the image.

Because edges in images generally have strong intensity contrasts, an increase (or decrease) in intensity from one pixel to the next is indicative of an edge. Accordingly, many edge detection techniques involve calculating a derivative of the intensity changes in pixel values (e.g., intensity changes between a first pixel and an adjacent pixel or more than one adjacent pixels). With regard to a first derivative, an edge transition can occur at a local maxima. With regard to second derivatives, edges occur at zero crossings. The edge detection process disclosed in U.S. Patent Publication No. 2008/0169347, which is hereby incorporated by reference in its entirety, discloses methods for locating edges by convolving image data with a kernel that approximates a first or second derivative.

According to one edge detection technique, pixel values of adjacent pixels are compared to identify edge transitions. For example, a pixel value of a current pixel can be compared to a pixel value of a previous pixel. If the compared value is greater or equal to a threshold value, an edge has been found. Thus, the threshold value helps define the minimum modulation percentage in the pixel values between adjacent pixels needed to signify an edge transition. According to another edge detection technique, the current pixel value may be compared to more than one adjacent pixel (e.g., a window of pixels). By comparing the current pixel value to an average of a window of pixels, the effect of noise (e.g., an erroneously high or low pixel value) can be minimized. For example, pixel summing or averaging may be performed in a direction orthogonal to a virtual scan line as described in U.S. Patent Publication No. 2008/0169347. The edge detection module 330 may use any number of other edge detection techniques, such as one or more of the subpixel edge detection techniques disclosed in U.S. Pat. No. 5,446,271, which is hereby incorporated by reference in its entirety. In general, subpixel edge detection involves interpolating image intensities at intermediate positions between pixels.

In addition, the edge detection module 330 may use any number of other techniques to detect dark-to-light or light-to-dark transitions, such as the techniques (including delay line signal processing) described in U.S. Pat. No. 5,463,211, entitled "Method And Apparatus For Detecting Transitions In A Time Sampled Input Signal" and issued in the name of inventors Thomas C. Arends and Randy D. Elliott, and in U.S. Pat. No. 5,371,361, entitled "Optical Processing System" and issued in the name of inventors James E. Colley, Thomas C. Arends, Blaine F. Loris, Donald S. Peterson, James W. Ring, and Matt D. Schler, both of which patents are owned by the owner of the present application and are hereby incorporated by reference in their entireties. Further related techniques may be found in U.S. Pat. No. 5,298,728, entitled "Signal Processing Apparatus and Method" and issued in the name of inventors Randy D. Elliott and Blaine F. Loris, which patent is also owned by the owner of the present application and is hereby incorporated by reference in its entirety. Further, any number of edge detection operators (or variations of operators) may be used. For example, first order operators, such as Canny, Prewitt, Sobel, and Roberts Cross, may be used. In addition, second order operators, such as Marr-Hildreth, may be used.

Based on the edge locations, one or more decoders 340 (e.g., low level decoders, high level decoders, or any combination thereof) may convert the sequence of edges and spacing between the edges into data usable by the host 197. For example, a low level decoder may convert the sequence of edges and spacing between the edges into a set of barcode elements, such as bars and spaces, and a high level decoder may convert the barcode elements into characters, which may be alphanumeric. The specific nature of the decoder(s) varies depending on the particular symbology used to encode the data. For example, in the PDF417 symbology data is encoded by (1) converting data into codewords (i.e., high level encoding) and (2) representing the codewords with a certain sequence of bars and spaces (i.e., low level encoding). Thus, in the PDF417 symbology, data may be decoded by (1) converting the sequence of bars and spaces into codewords low level decoding) and (2) converting the codewords into data (i.e., high level decoding). Accordingly, after the edge detection module 330 identifies edges in the data captured by the imager 250, the relative locations of the edge transitions can be converted back into codewords via a low level decoder and the codewords can be converted into data usable by the host 197 by a high level decoder.

The signal processor 260 may include or execute a post processing module 350 to further process the output from the decoder(s) 340 before sending the data to the host 197 (e.g., via interface 195). For example, the post processing module 350 may determine whether one or more of the sub-regions contains decodable data and, for each sub-region that contained decodable data, revise the processing priority or update a respective indication of the likelihood of decoding the sub-region relative to the other sub-regions. In other words, the post processing module 350 may update the prioritization scheme or the priority or prioritization list so that sub-regions of subsequent images that are most likely to contain decodable data (based on the sub-regions of previous images that contained decodable data) are processed first. If the one or more sub-regions that have consistently contained decodable data (e.g., an entire or full optical code or at least an identifiable portion thereof, such as a character) are processed first and contain decodable data representing a complete optical code, the remaining sub-regions do not need to be processed, which saves processing resources and results in quicker decodes. Thus, the post processing module 350 may provide feedback 352 (which may be direct feedback or indirect feedback) to the prioritization module 320 or update the processing order or priority list stored in memory (e.g., memories 160 or 170).

The post processing module 350 may also perform other functions, such as combining partial sections of an optical code to form data representing the complete optical code using a process known as stitching, further details of which can be found in U.S. Pat. No. 5,493,108, which is hereby incorporated by reference in its entirety. Additionally, the post processing module 350 may also include control logic to determine whether decoded data should be sent to the host 197 and, if so, when to send the decoded data to the host 197. According to one embodiment, the host 197 updates the prioritization scheme instead of or in addition to the post processing module 350. Thus, the host 197 may provide feedback (directly or indirectly) to the prioritization module 320.

The signal processor 260 may further include or execute other modules, such as an amplification module to amplify one or more spatial frequencies, a filtering module, and a timer module. The timer module may be used to indicate when to stop processing the raw data for decodable data (e.g., stop attempting to find characters). For example, to maximize throughput, the edge detection module 330, the decoder(s) 340, or both, may stop looking for characters or other decodable data after a certain period of time or after a certain number of data frames have been captured. In other words, the timer module prevents the edge detection and decoder modules from spending too much time trying to decode data that is not readable or decodable (or at least not easily readable or decodable) or that has already been decoded. While FIG. 3 illustrates particular modules for the sake of illustration, in other embodiments, one or more of the illustrated modules may be merged, divided into additional modules, or omitted. The modules or components illustrated in FIG. 3, as well as the functions of those modules or components, may be implemented in the scanner system 100 or a general-purpose or special-purpose computing environment.

Figure 4A:
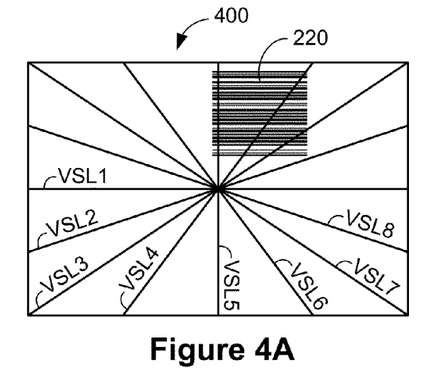
FIGS. 4A-4C illustrate the optical code reader of FIG. 1 extracting data from a captured image of an optical code corresponding to various sub-regions.
Figure 4B:
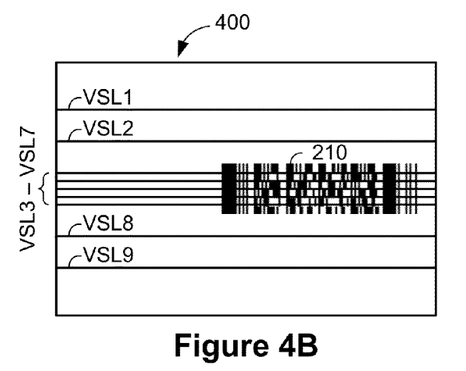
Figure 4C:
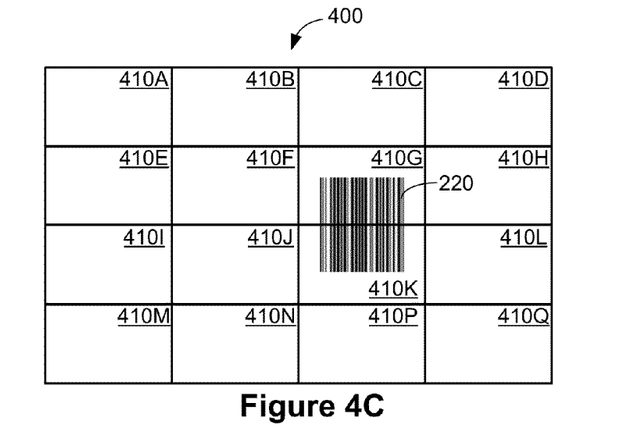

FIG. 4A diagrammatically illustrates reading or assembling samples or pixels from the imager 250 or a raster image 400 (or from an incoming video stream) lying along one or more sub-regions or virtual scan lines VSL1 through VSL8, which may then be processed or stored in a buffer or other memory. By way of example, the raster 400 represents a generally rectangular grid of image data captured by the image sensor and may comprise a data file wherein each pixel is represented by a certain number of bits. As shown in FIG. 4A, sub-regions VSL4 and VSL5 are both coincident with the optical code 220. As shown, sub-region VSL3 only captures partial information about the optical code 220. The partial portion of the optical code 220 may be stitched together with other partial portions to form a complete optical code. The sub-regions can be arranged in any pattern, which is generally selected so that there is a reasonable likelihood that at least one of the sub-regions will be coincident with an optical code. Accordingly, the sub-region pattern may be defined based on the dimensions of the optical code to be scanned, the scanning area size, the scanning sensor and optics characteristics, the processing bandwidth, or any combination thereof. For example, as shown in FIG. 4B, a sub-region pattern including sub-regions VSL1 through VSL9 may be used to decode stacked codes, such as PDF417. Additionally, while data may be extracted from a captured image of an optical code along various sub-regions, data corresponding to other portions of the acquired image (e.g., one or two dimensional virtual scan lines, sub-regions, or sub-pixels) may be extracted. For example, as shown in FIG. 4C, data corresponding to rectilinear shaped sub-regions 410A through 410Q may be extracted and processed using any suitable decoding technique, such as a two-dimensional decoding algorithms. Further, the entire acquired image may be processed using a two-dimensional decoding algorithm to identify and decode any optical codes within the acquired image.

Any suitable two-dimensional decoding algorithm may be used that processes the image data to identify and possibly decode any optical codes within the acquired image and report a position of each optical code within the acquired image. For example, a two-dimensional decoding algorithm may be implemented by an edge detection module (e.g., edge detection module 330 of FIG. 3) and may process the image data in a brute-force manner to locate edge transitions and decode the image data based on the edge transition locations. The edge detection module may locate edge transitions in the image data by comparing a pixel value of one pixel to a pixel value of one or more adjacent pixels, starting, for example, in the upper-left corner of the acquired image and moving to the right one pixel at a time. Upon reaching the right-most pixel, the edge detection module may move down one row and continue comparing adjacent pixels moving to the left one pixel at a time. Upon reaching the left-most pixel, the edge detection module may move down another row and repeat the pixel comparisons in a serpentine like manner until reaching the lower-right corner of the acquired image. At the same time (or after the edge transition locations have been identified), one or more decoders (e.g., a low level decoder, a high level decoder, or both) may attempt to decode the image data based on the edge transition locations. After decoding an optical code, the two-dimensional decoding algorithm outputs a position within the acquired image of the decoded data (e.g., the optical code is bound by a box or rectangle having certain pixel coordinates within the image). Many variations of two-dimensional decoding algorithms may be used. For example, the two-dimensional decoding algorithm may process the image data in other orientations, such as any combination of top-to-bottom, bottom-to-top, left-to-right, right-to-left, and diagonally. Additionally, two-dimensional decoding algorithm may process the image data from an image buffer or an incoming video stream. Additional details regarding two-dimensional decoding algorithms and example two-dimensional decoding algorithms can be found in international standards associated with symbology types, such as ISO/IEC 16022:2006, entitled "Information technology—Automatic identification and data capture techniques—Data Matrix bar code symbology specification", available from the International Organization for Standardization (ISO) or Geneva, Switzerland.

The description of FIGS. 1 through 4C provide an overview of an example scanning system and associated concepts suitable for implementing prioritized sub-region processing. Other examples and additional details regarding scanning systems, optical code readers, virtual scan lines, and associated concepts may be found in the following commonly owned United States patents and patent applications, which are incorporated by reference herein in their entireties: U.S. Pat. Nos. 5,446,271; 5,635,699; 6,142,376; 7,398,927; U.S. Application Publication No. 2006/0278708; and U.S. Application Publication No. 2006/0081712. In light of the teachings herein, skilled persons will be aware of equivalent architectures, implementations, and variations for optical code readers that are suitable for implementing prioritized sub-region processing.

Prioritized Sub-Region Processing

Certain sub-regions or portions of a captured image may be more likely to contain decodable data than other sub-regions or portions of a captured image. For example, an operator of an optical code reader may have a preferred manner in which to present an optical code to the optical code reader (e.g., vertically as shown in FIG. 4A) or a preferred manner in which to aim the optical code reader at the optical code. By way of another example, objects having optical codes thereon may travel along a conveyor system in generally the same orientation (e.g., packages in a sorting center). If the sub-regions are processed in the same order for every scan and one or more of the sub-regions containing the decodable data are processed last each time, valuable decoding time is wasted attempting to decode the sub-regions that contain no decodable data. Accordingly, a preferred embodiment prioritizes the order in which the sub-regions are processed based on the likelihood that each sub-region will contain decodable data. If one or more of the sub-regions having the highest priority contains decodable data, the remaining sub-regions may not be processed, which saves processing resources. In other words, if an entire optical code is decoded after processing one or more sub-regions, the other unprocessed sub-regions may not be processed.

Figure 5:
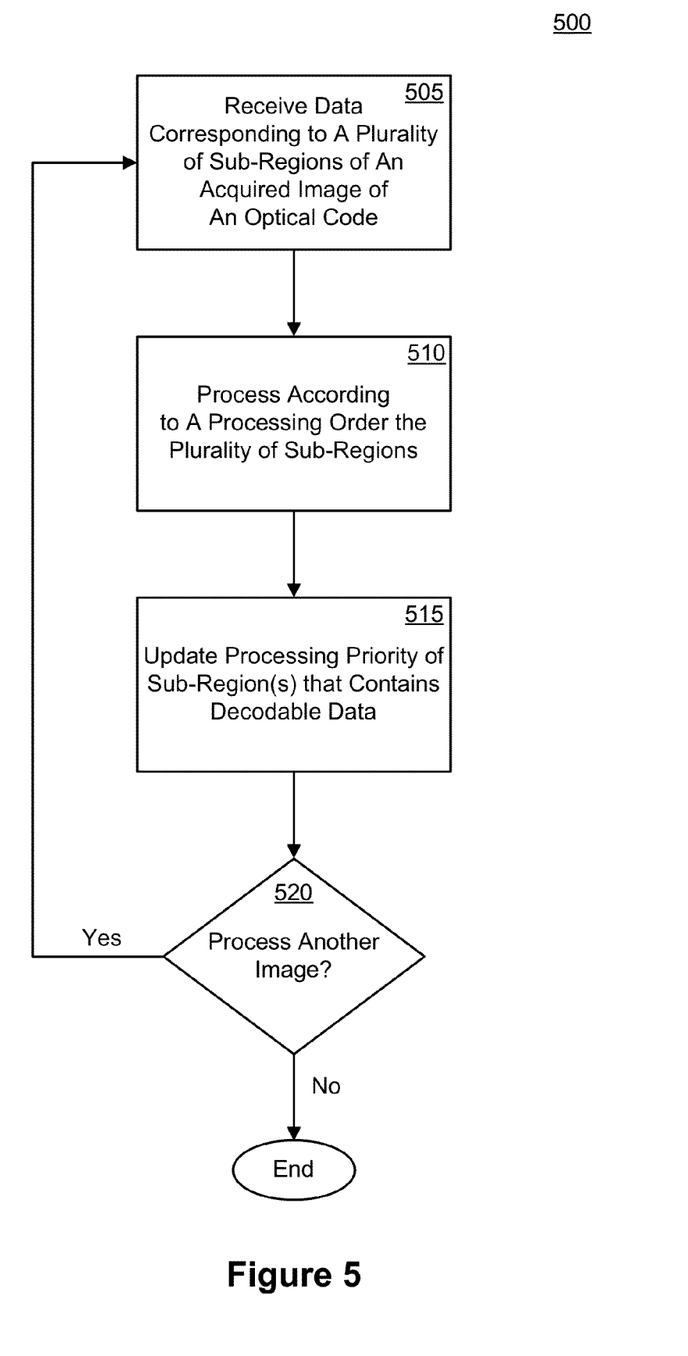
FIG. 5 is a flowchart illustrating a method of decoding an optical code by prioritizing an order in which to decode various sub-regions, according to one embodiment.
Figure 6A:
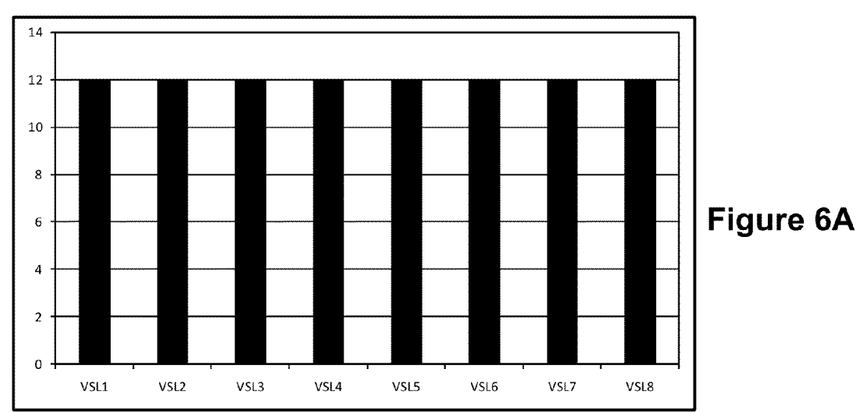
FIGS. 6A-6E are graphical displays of various example indications of each sub-region's likelihood of containing decodable data with respect to the other sub-regions.

FIG. 5 is a flowchart illustrating a method 500 of decoding an optical code by prioritizing an order in which to decode various sub-regions, according to one embodiment. Upon initialization of the data reader or scanner system 100 (e.g., when the scanner system 100 is powered-up or reset) or after a period of inactivity (e.g., a period of time in which no optical codes have been decoded) one or more variables associated with the implementation of method 500 may be reset to an initial value. For example, each sub-region of an acquired image may have associated therewith a processing priority or an indication of a likelihood of decoding the sub-region with respect to the other sub-regions. Thus, with reference to FIG. 4A, each of the sub-regions VSL1 through VSL8 may have a processing priority or a likelihood of decodability indicator associated therewith represented in numerical form, such as a numerical value ranging from 0 to 99. According to one embodiment, the processing priorities of the sub-regions are stored in a priority list, which may be stored in memory (e.g., memories 160 or 170). In other words, the priority list may include the processing priorities of the sub-regions ordered from highest to lowest according to processing priority. Thus, upon initialization of the scanner system 100 or after a period of inactivity, the priority list may be set to a default order, such as, for example, processing in sequential order VSL1 through VSL8 illustrated in FIG. 4A. According to another embodiment, the indicators associated with each sub-region are stored in an array, such as the array graphically represented in FIG. 6A wherein each indicator has a value of twelve. In other words, the array represented in FIG. 6A indicates that each of the sub-regions has the same relative likelihood of decodability, which may be the case when the scanner system 100 is initialized or after a period of inactivity between decodes (which may be probative of a change in operators). Thus, upon initialization of the scanner system 100 or after a period of inactivity, the likelihoods of decodability associated with each sub-region may be set to an initial value. While the initial value for the array represented in FIG. 6A is twelve, any numerical value may be used and the numerical values for each sub-region need not be equal. For example, the y-axis of FIG. 6A may have units of percentage and the sum of all the sub-regions may total approximately 100 percent. Thus, with eight sub-regions, each sub-region may have a value of 12.5 percent (assuming each sub-region has the same processing priority or relative likelihood of decodability).

After the scanner system 100 has been initialized, data corresponding to a plurality of sub-regions of an acquired image of an optical code is received at step 505. For example, after the scanner system 100 has been initialized, the operator may present an item or object (e.g., with an optical code thereon), such as the object 200, to the window 140 or sweep the object past the window 140 (or sweep the scanner system 100 past the object) so that one or more images of the object within a scan or read volume or scan or read region of the scanner system 100 can be acquired (e.g., via imaging based scanner 120). Next, all or a portion of the image data may be extracted from the image and possibly stored in memory (e.g., raster 400 of FIG. 4A). For example, the sub-region extraction module 310 may extract pixel data corresponding to one or more sub-regions, such as one or more virtual scan lines, from a captured image and store the extracted data in a reserved segment of memory used to hold data while the data is being processed. By way of another example, the sub-region extraction module 310 may extract pixel data corresponding to the rectilinear shaped sub-regions 410A through 410Q illustrated in FIG. 4C so that the sub-regions 410A through 410Q may be processed according to a particular processing order using a two-dimensional decoding algorithm.

According to a preferred embodiment, each sub-region of the plurality of sub-regions has associated therewith a processing priority or an indication of a likelihood of decoding the sub-region with respect to the other sub-regions. The order in which to process the plurality of sub-regions may be predetermined based on the prioritization scheme or processing order (e.g., if an ordered list is used, a sub-region's position in the list determines the decoding order of the sub-region) or may optionally be determined based on a processing priority associated with the sub-region or an indication of a likelihood of decoding each of the sub-regions with respect to the other sub-regions. For example, as discussed above, a numerical value indicative of the processing priority or the likelihood of decoding each of the sub-regions may be stored in an array, wherein a high numerical value indicates a sub-region with a high processing priority or high decodability probability and a low numerical value indicates a sub-region with a low processing priority or a low decodability probably. Thus, the prioritization module 320 may sort the array from highest to lowest based on the numerical value associated with each of the sub-regions or search for the highest value so that the sub-region having the highest numerical value is processed first. If one or more of the numerical values in the array are equal (e.g., there is an equal probability of decoding the respective sub-regions), the respective sub-regions may be processed in an arbitrary order or may be processed according to another prioritization scheme. For example, each indicator in the array graphically represented in FIG. 6A has a numerical value of twelve. Thus, the sub-regions may be processed in an arbitrary order, the sub-regions may be sequentially processed (e.g., VSL1 followed by VSL2 followed by VSL3 and so forth), or the sub-regions may processed based an orientation within the raster 400 (e.g., process the centrally located sub-regions first or process the horizontally or vertically disposed sub-regions first). By way of another example, instead of or in addition to utilizing an array wherein numerical values indicate a decoding order, an ordered list may be used in which a sub-region's position in the list determines the decoding order of the sub-region (e.g., the sub-regions located nearest the top of the list are decoded first).

At step 510, each sub-region is processed according to a processing order for decodable data corresponding to an optical code. For example, the sub-regions may be processed in descending numerical order starting first with the sub-region having the highest numerical value in an array (e.g., sub-region VSL5 in FIG. 6D). By way of another example, sub-regions that are part of an ordered list may be processed according the sub-region's position in the list (e.g., the sub-region located at the top of the ordered list is processed first). Any suitable technique may be used to process the sub-regions for decodable data. For example, the edge detection module 330 may identify edge transition locations in the data using any number of edge detection techniques, such as those previously described. While certain embodiments analyze only select portions of the acquired image data (e.g., sub-regions or virtual scan lines), other embodiments analyze all of the data captured by the imaging based scanner 120 (e.g., by sequentially processing the raster horizontally or vertically). Based on the edge locations, one or more decoders 340 (e.g., low level decoders, high level decoders, or any combination thereof) may convert the sequence of edges and spacing between the edges into data usable by the host 197. The complete optical code may be stored (e.g., in memories 160 or 170), transmitted to a computer (e.g., the host 197) for use or further decoding, or both.

At step 515, the processing priority or the indication of the likelihood of decoding a sub-region is updated for each sub-region that contains decodable data as a result of the processing performed at step 510. An optional step of determining (e.g., based on the processing performed at step 510) whether one or more of the plurality of sub-regions contains decodable data is performed before step 515. Any suitable technique may be used to determine whether one or more of the plurality of sub-regions contains decodable data. For example, if a sub-region contains at least one decodable character (e.g., as identified by one or more decoders 340, such as one or more low level decoders, high level decoders, or any combination low level and high level decoders), it may be determined that the sub-region contains decodable data and the processing priority or the numerical value associated with that sub-region is updated at step 515. A decodable character may be identified if, for example, the relative locations of edge transitions and spaces therebetween yield at least one valid character, codeword, overhead character (e.g., a start character, stop character, center character, guard character, or check character), or any combination thereof. Additionally, it may be determined that a sub-region contains decodable data and the processing priority or the numerical value of that sub-region may be updated at step 515 if a minimum number of edge transitions are identified in the data associated with the sub-region. While it may be determined that the sub-region contains decodable data upon finding only one decodable character, certain embodiments may be configured such that it is not determined that the sub-region contains decodable data unless the sub-region contains sufficient data to decode a complete optical code. For example, with reference to FIG. 4A, only the sub-regions VSL4 and VSL5 would be determined to contain decodable data because only the data associated with the sub-regions VSL4 and VSL5 would contain the complete optical code 220.

The processing priority or the indication of the likelihood of decoding a sub-region may be updated at step 515 in various ways. For example, as shown in FIG. 4A, the sub-regions VSL3, VSL4, and VSL5 are each at least partially coincident with the optical code 220 and should contain decodable data. Thus, at step 515, the indicators associated with the sub-regions VSL3, VSL4, and VSL5 are incremented (by one, for example) and stored in the array. If the indicator associated with each sub-region is expressed as a percentage and the sum of all the sub-regions total approximately 100 percent, increasing an indicator associated with one sub-region (e.g., a sub-region that contained decodable data) may require decreasing an indicator associated with another sub-region (e.g., a sub-region that did not contain decodable data).

By way of another example, if each indicator in the array had a starting value of twelve (see, e.g., FIG. 6A) before step 515, the indicators associated with the sub-regions VSL3, VSL4, and VSL5 would be incremented by one (or another number, such as 1, 2, 3, 4, etc.) to a value of thirteen at step 515. If the operator presents another object or a new object with an optical code thereon to the scanner system 100 in the same or similar manner (e.g., vertically as illustrated in FIG. 4A), the optical code associated with the new object can quickly be decoded from the data corresponding to one or more of the sub-regions VSL3, VSL4, and VSL5 of a newly acquired image of the object as a result of the updated processing priorities associated with the sub-regions VSL3, VSL4, and VSL5. In other words, the sub-regions VSL3, VSL4, and VSL5 would be processed before the other sub-regions because the sub-regions VSL3, VSL4, and VSL5 each have a numerical value of thirteen while the other sub-regions have a value of twelve.

Figure 6B:
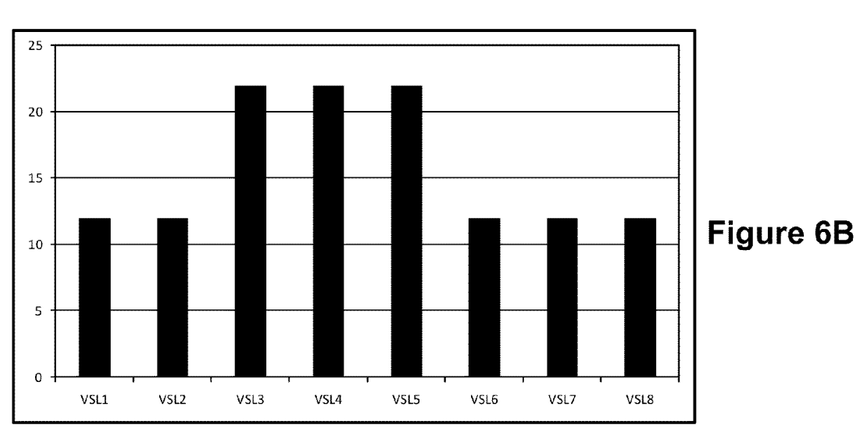
Figure 6C:
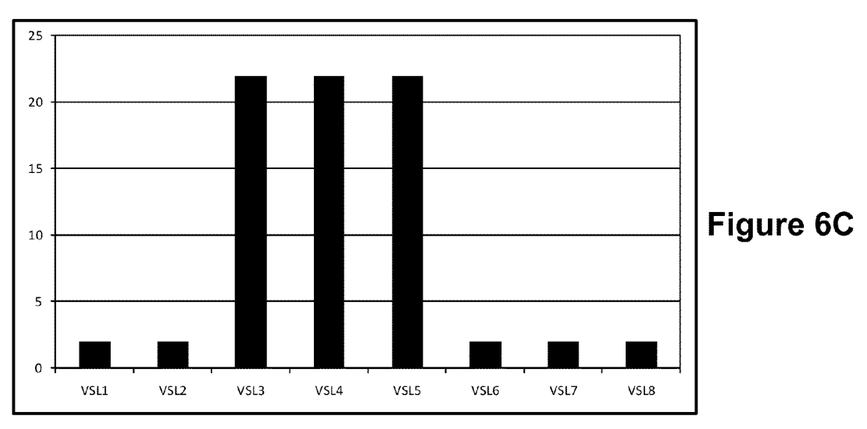

If the operator continues to present objects with optical codes thereon to the scanner system 100 in the same or similar manner (e.g., vertically as illustrated in FIG. 4A), the processing priorities or the numerical values associated with the sub-regions VSL3, VSL4, and VSL5 will continue to increase (thereby reflecting the higher likelihood that the sub-regions VSL3, VSL4, and VSL5 will contain decodable data in subsequent scans). For example, if the operator presented ten objects with optical codes thereon to the scanner system 100 in the manner illustrated in FIG. 4A, the numerical values associated with the sub-regions VSL3, VSL4, and VSL5 should be incremented ten times to a value of twenty-two as depicted in FIG. 6B. According to a preferred embodiment, the processing priorities or the numerical values associated with sub-regions that do not contain decodable data (e.g., as a result of the processing performed at step 510) are not updated (e.g., before, during, or after step 515). Thus, if none of the sub-regions contain decodable data at step 510, the processing priorities or the numerical values associated with the sub-regions will not be updated and the processing order for the sub-regions of a newly acquired image during the next iteration of step 510 may not change. However, according to one embodiment, the sub-regions that did not contain any decodable data at step 510 will be updated (e.g., decremented) as part of step 515 or before or after step 515. Thus, if the operator presented ten objects with optical codes thereon to the scanner system 100 in the manner illustrated in FIG. 4A, the processing priorities or the numerical values associated with the sub-regions VSL3, VSL4, and VSL5 should be incremented ten times to a value of twenty-two and the processing priorities or the numerical values associated with the sub-regions VSL1, VSL2, VSL6, VSL7, and VSL8 should be decremented ten times to a value of two as depicted in FIG. 6C.

By way of still another example, if an ordered list is used to determine the decoding or processing order of the sub-regions (e.g., the sub-regions located nearest the top of the list are decoded first), the position of each sub-region that contains decodable data (as a result of the processing at step 510) will be moved up on the list (with respect to the sub-regions that did not contain decodable data) at step 515. According to a preferred embodiment, a position in the list of a sub-region that did not contain decodable data is not updated (e.g., before, during, or after step 515). However, according to one embodiment, a position in the list of a sub-region that did not contain decodable data is updated (e.g., before, during, or after step 515). For example, the position of each sub-region that did not contain decodable data may be moved down on the list with respect to the other sub-regions.

The update at step 515 preferably occurs after the processing of a current image is complete. For example, the update at step 515 may occur after each of the sub-regions has been processed or after a timer indicating when to stop attempting to decode the image or sub-region expires. Additionally or alternatively, the update at step 515 may occur after it is determined that each sub-region has at least one decodable character. In other words, after a sub-region is processed at step 510 and it is determined that the sub-region contains decodable data corresponding to an optical code, the processing priority associated with that sub-region can be updated (e.g., before processing another sub-region). Further, after each sub-region is processed for decodable data at step 510, it may optionally be determined whether decodable data corresponding to an entire optical (e.g., by identifying a start and stop character associated with the optical code) is contained in the sub-region along or in combination with one or more previously processed sub-regions. If it is determined that decodable data corresponding to an entire optical is contained in the sub-region, there may be no need to process the remaining sub-regions (i.e., the sub-regions having a lower processing priority), which saves processing resources. With reference to FIG. 4A, the sub-region VSL5 may have sufficient data to decode the optical code 220. If the sub-region VSL5 is processed first (or processed before some of the other sub-regions), it may be determined that sub-regions VSL1, VLS2, VLS3, VSL4, VSL6, VSL7, or VSL8 do not need to be processed. In other words, if an entire optical code is decoded after processing one or more of the sub-regions having a higher processing priority, the other unprocessed sub-regions do not need to be processed and the method may proceed directly to step 520.

After the respective processing priorities or the indications have been updated at step 515, it may be determined at step 520 whether another image (along with corresponding sub-regions) should be processed. If it is determined at step 520 that another image should be processed, the method 500 returns to step 505 so that data corresponding to a plurality of sub-regions of an acquired image of another optical code (e.g., second optical code, third optical code, etc.) is received (e.g., an image of a different optical code on another object may be acquired). Then steps 510 and 515 can be repeated for the data corresponding to the new optical code. If any of the processing priorities or the indications were updated during any of the previous iterations of step 515, the updated processing priorities or the indications for each sub-region would be used at step 510 to process the sub-regions for decodable data. For example, after ten iterations, the processing priorities or the numerical values associated with the sub-regions VSL3, VSL4, and VSL5 of FIG. 4A may be incremented to a value of twenty-two as depicted in FIG. 6B. Thus, during the next iteration of step 510, the processing priorities or the numerical values depicted in FIG. 6B would be used instead of the processing priorities or the numerical values depicted in FIG. 6A. According to one embodiment, after the last sub-region has been processed at step 510, a timer may be started. If sufficient time elapses before the next decode (or image capture), the processing priorities or the numerical values may be reset to default values (e.g., the values depicted in FIG. 6A).

If it is determined at step 520 that another image should not be processed, the method 500 ends. The decoded data or the decodable data corresponding to the optical code may then be further processed to form a dataset representing a complete optical code. For example, if a first sub-region captures a portion of the optical code and a second sub-region captures the rest of the optical code, the two partial portions of the optical code may be correlated and stitched together (possibly with other partial portions) to form a complete optical code. Additionally, if multiple images of the optical code are captured at a certain frame rate as the object is swept past the window 140, data may be correlated among various data frames and stitched together. The complete optical code dataset may then be stored (e.g., in memories 160 or 170), transmitted to a computer (e.g., the host 197) for use or further decoding, or both.

Other suitable methods of decoding an optical code by prioritizing an order in which to decode various sub-regions may be utilized. For example, instead of sorting the array from highest to lowest based on the processing priority or the numerical value associated with each of the sub-regions, the prioritization module 320 can search the array for the highest processing priority or numerical value and then process the corresponding sub-region. If the sub-region does not contain any decodable data, the prioritization module 320 can search for the second highest processing priority or numerical value and process that corresponding sub-region. If the sub-region (having the second highest numerical value) does not contain any decodable data, the prioritization module 320 can incrementally search for and process the remaining sub-regions in decreasing order according to each sub-region's associated processing priority or numerical value until the optical code is successfully decoded or the prioritization module 320 reaches the sub-region having the lowest processing priority or numerical value.

Figure 6D:
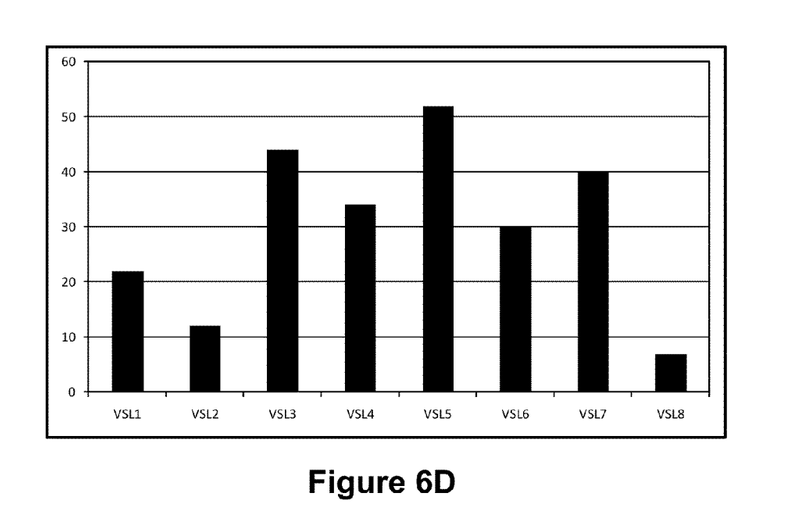

According to one embodiment, one or more the sub-regions with the lowest associated processing priorities or numerical values are not decoded (thus conserving processing time and resources). For example, after a certain number of iterations of the method 500 using the sub-region pattern of FIG. 4A, each sub-region in the array may have processing priorities or numerical values as depicted in FIG. 6D. Based on the relatively low likelihood that the sub-regions VSL2 and VLS8 will contain decodable data (in comparison with the other sub-regions), the data associated with the sub-regions VSL2 and VLS8 may not be processed. The determination of which sub-regions not to process may be made in several ways. For example, sub-regions having processing priorities or numerical values falling below a certain threshold (e.g., a numerical value of 20 in FIG. 6D) or a certain number of sub-regions having the lowest likelihood of containing decodable data relative to the other sub-regions (e.g., the lowest two processing priorities or numerical values or the bottom quarter processing priorities or numerical values) may not be processed.

Figure 6E:
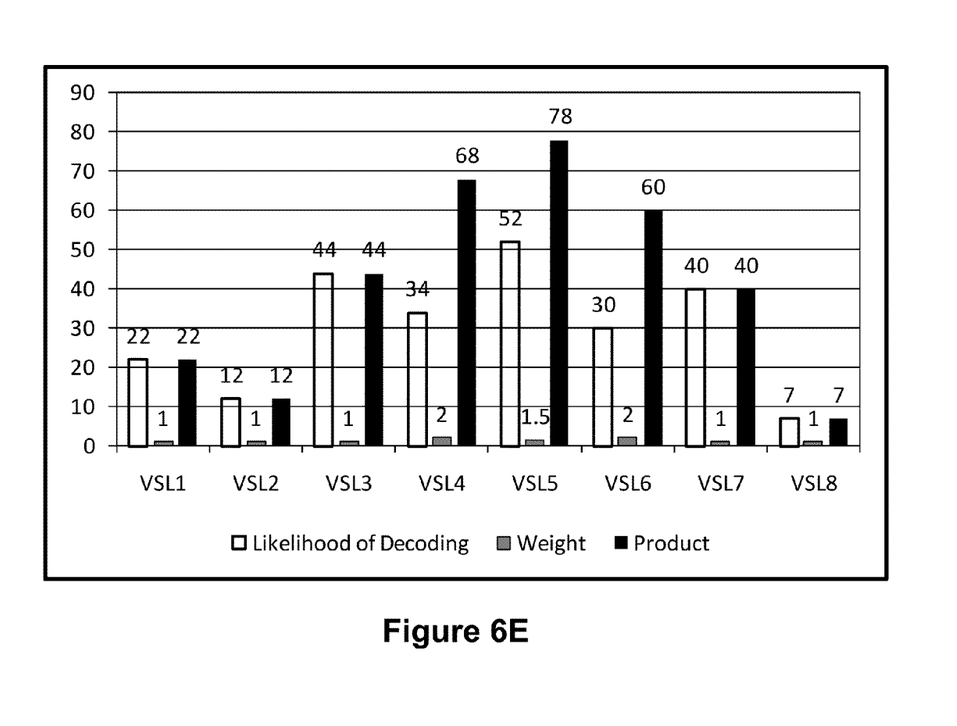

In addition to having a processing priority or an indication of a likelihood of containing decodable data with respect to the other sub-regions, each sub-region may also have associated therewith an indication of a weight or factor to assign the sub-region (a numerical value between 1 and 5, for example). The processing order in which to process the data associated with each of the sub-regions may then be based on the product of each sub-region's processing priority or indication of the likelihood of containing decodable data and each sub-region's corresponding weight or factor. For example, FIG. 6D depicts numerical values (which reflect the likelihood of decoding each respective sub-region) associated with each of the sub-regions VSL1 through VSL8 of FIG. 4A. Each of the sub-regions VSL1 through VSL8 in FIG. 6D are equally weighted. However, as shown in FIG. 6E, sub-regions VSL4, VSL5, and VSL6 are more heavily weighted relative to the other sub-regions. If the decode or processing order of the sub-regions is based on the product of each sub-region's numerical value and associated weight, the area of each of the bars depicted in FIG. 6E can be used to determine the decode order. For example, if each sub-region has equal weight, the decode order based on the numerical values depicted in FIG. 6D would be sub-regions VSL5, VSL3, VSL7, VSL4, VSL6, VSL1, VSL2, and VSL8. However, by more heavily weighing sub-regions VSL4, VSL5, and VSL6 as depicted in FIG. 6E, the sub-regions VSL4 and VSL6 may be decoded before sub-regions VSL3 and VSL7.

Assigning a weight to each sub-region may be useful when, for example, all sub-regions have the same numerical (e.g., upon reset) if the weights associated with at least one of the sub-regions differ. In other words, the weight may serve as a tiebreaker and determine which sub-region is processed first. The weight or factor assigned to each sub-region may be based on which sub-regions have historically yielded decodable data (e.g., the sub-region VSL1 may be more heavily weighted if the sub-region VSL1 has historically contained decodable data).

According to another embodiment, instead of or in addition to prioritizing the order in which to decode the sub-regions of an acquired image, only sub-regions that have previously contained decodable data are decoded in subsequent frames. For example, upon initialization, the scanner system 100 may operate in a learning mode for a certain number of scans (e.g., the first ten unique optical codes captured) and then transition to a selective sub-region processing mode in which only the sub-regions that contained decodable data during the learning mode are decoded. During the learning mode, all of the sub-regions are processed and the sub-region prioritization module 320 does not process the sub-regions based on a processing order. Instead, data is accumulated regarding which sub-regions contain decodable data. For example, the scanner system 100 may acquire a set of images (each of which contain at least one unique optical code), extract data from each image corresponding to a plurality of sub-regions of the image, determine which of the sub-regions contain decodable data, and store an indication of which sub-regions contained decodable data (e.g., numerical values in an array). Then, the stored indications of the sub-regions that contained decodable data are compared for each acquired image to determine whether one or more sub-regions contained decodable data in more than one acquired image.

For example, if the operator presents objects with optical codes thereon to the scanner system 100 in a manner similar or identical to that shown in FIG. 4A during the learning mode, it may be determined that the sub-regions VSL3, VLS4, and VSL5 contained decodable data in more than one acquired image. When the scanner system 100 transitions to the selective sub-region processing mode, only data associated with the sub-regions VSL3, VSL4, and VSL5 are decoded. Additionally, during the selective sub-region processing mode only data associated with the sub-regions VSL3, VSL4, and VSL5 may be extracted from acquired images (e.g., data associated with sub-regions VSL1, VSL2, VSL6, VSL7, and VSL8 will not be extracted from the image). During the selective sub-region processing mode the sub-regions that contained decodable data in more than one acquired image may be decoded in an arbitrary order or may be decoded according to a determined order (e.g., step 510 of FIG. 5). Additionally, the scanner system 100 may periodically reenter the learning mode (e.g., after a certain period of time with no decodes or at regular intervals, such as approximately every three seconds) to determine whether any of the other sub-regions contain decodable data in more than one acquired image.

According to one embodiment, the processing priorities or numerical values (which reflect the likelihood of decoding each respective sub-region) associated with each of the sub-regions are stored (e.g., in memory 160, drive 170, or on a centralized database accessible via the network interface 195) for each operator (e.g., store employees). Thus, before using a scanner system 100, the operator may log in and the operator's respective sub-region profile may be loaded (which allows the scanner system 100 to decode the sub-regions that typically contain decodable data for the operator). After scanning is complete, the operator may log off and the operator's respective sub-region profile may be stored (e.g., in memory 160, drive 170, or on the centralized database).

The methods and systems disclosed herein may be implemented in or by any suitable hardware, software, firmware, or combination thereof. Accordingly, as used herein a component or module can comprise hardware, software, firmware, or any combination thereof (e.g., self-contained hardware or software components that interact with a larger system). For example, the methods and systems may exist as one or more software or firmware programs comprised of program instructions in source code, object code, executable code or other formats. A software module or component may include any type of computer instruction or computer executable code located within a memory device or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local or remote memory storage devices. In addition, data being tied or rendered together in a database record may be resident in the same memory device, or across several memory devices, and may be linked together in fields of a record in a database across a network.

Embodiments may include various steps, which may be embodied in machine-executable instructions to be executed by a general-purpose processor, special-purpose processor, or other electronic device. Alternatively, the steps may be performed by hardware components that include specific logic for performing the steps or by a combination of hardware, software, firmware, or any combination thereof. A result or output from any step, such as a confirmation that the step has or has not been completed or an output value from the step, may be stored, displayed, printed, or transmitted over a wired or wireless network.

Embodiments may also be provided as a computer program product embodied on a machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product embodied on a machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

While embodiments disclosed herein have been discussed in combination with optical codes, the embodiments disclosed herein may be utilized by other automated data collection/capture techniques including, but not limited to, laser based scanners and optical card readers. In addition, while the term character has been used herein to refer to a single group of bars and spaces that represent a specific number of letters, numbers, punctuations marks, or other symbols, it may also refer to a graphical shape representing a letter, numeral, or symbol or a letter, digit, or other symbol that is used as part of the organization, control, or representation of data. Further, while certain embodiments have been described with reference to sub-regions, other portions (e.g., one or two dimension virtual scan lines, sub-regions, sub-blocks, pixels, or sub-pixels) of the acquired image or the entire acquired image may be used. Additionally, the sub-region prioritization module 320 may comprise or utilize any combination of the embodiments disclosed herein.

Thus, as should be appreciated in view of the teachings herein, certain embodiments may be capable of achieving certain advantages, including by way of example and not limitation one or more of the following: (1) providing a system and method to achieve higher scanning speeds; (2) providing a system and method to decode data associated with an optical code that requires less processing power; (3) providing a system and method to prioritize an order in which to process a plurality of sub-regions of an acquired image for decodable data; (4) providing a system and method to selectively decode a plurality of sub-regions of an acquired image; (5) providing a system and method to achieve higher scanning speeds without changing the hardware of an optical code reader; (6) providing a system and method to determine operator behavior with respect to how the operator presents optical codes to an optical code reader so that only certain sub-regions of an acquired image of an optical code need to be processed; and (7) providing a system and method to update the order in which to decode sub-regions of an acquired image of an optical code that accommodates scanning related behavioral changes of the operator.

The terms and descriptions used herein are set forth by way of illustration only and are not meant as limitations. Those skilled in the art will recognize that many variations can be made to the details of the above-described embodiments without departing from the underlying principles of the invention. The scope of the invention should therefore be determined only by the following claims (and their equivalents) in which all terms are to be understood in their broadest reasonable sense unless otherwise indicated.

The invention claimed is:

1. A method of processing an optical code by a data reader, comprising the steps of:
    acquiring a first image of a first optical code within a scan volume of the data reader, the acquired first image comprising a plurality of sub-regions;
    receiving data corresponding to the plurality of sub-regions of the acquired first image of the first optical code, wherein each sub-region has associated therewith a processing priority;
    processing the sub-regions for decodable data corresponding to the first optical code in a processing order corresponding to the processing priority of the sub-regions;
    determining based on the step of processing the sub-regions whether one or more of the sub-regions contains decodable data;
    if it is determined that a sub-region contains decodable data, increasing the processing priority associated with said sub-region;
    determining whether a sub-region alone or in combination with one or more previously processed sub-regions contains decodable data corresponding to an entirety of the first optical code;
    if it is determined that no sub-region alone or in combination with one or more previously processed sub-relations contains decodable data corresponding to the entirety of the first optical code, terminating the step of processing the sub-regions of the first image;
    acquiring a second image of the first optical code;
    receiving data corresponding to the plurality of sub-regions in the second image of the first optical code;
    processing the sub-regions of the second image for decodable data corresponding to the first optical code according to the processing order, wherein the processing order reflects the increased processing priority associated with the sub-region from the acquired first image of the first optical code that contained decodable data.

2. The method of claim 1 wherein the data reader comprises an imaging based scanning system including an image sensor that detects an image of an optical code within the scan volume the data reader, and further comprising:
    acquiring, via the image sensor, the image of the first optical code; and
    extracting data from the acquired image of the first optical code corresponding to the plurality of sub-regions, the plurality of sub-regions oriented with respect to one another in a pattern.

3. The method of claim 1, further comprising:
    assigning to each sub-region a numerical value indicative of its processing priority, wherein the numerical values assigned to the sub-regions upon initialization of the data reader are approximately equal to each other.

4. The method of claim 1, further comprising:
    after a predetermined period of time, resetting to a default value the processing priority associated with each sub-region.

5. The method of claim 1 wherein the sub-regions comprise virtual scan lines.

6. The method of claim 1 wherein the sub-regions comprise rectilinear shaped portions of the acquired image and the step of processing comprises using a two-dimensional decoding algorithm.

7. The method of claim 1 wherein the processing order is defined by a priority list stored in a memory associated with the data reader, the priority list including the processing priorities of the sub-regions ordered according to the processing priority from a highest processing priority to a lowest processing priority.

8. The method of claim 7 wherein the step of increasing the processing priority associated with a sub-region that contains decodable data comprises adjusting a position of said sub-region in the priority list.

9. The method of claim 1 wherein the processing priority associated with each sub-region comprises a numerical value, and wherein the step of increasing the processing priority associated with a sub-region that contains decodable data comprises incrementing the numerical value associated with said sub-region.

10. A method of processing an optical code by a data reader, comprising the steps of:
    acquiring an image of a first optical code within a scan volume of the data reader, the acquired image comprising a plurality of sub-regions;
    receiving data corresponding to the plurality of sub-regions of the acquired image of the first optical code, wherein each sub-region has associated therewith a processing priority;
    processing the sub-regions for decodable data corresponding to the first optical code in a processing order corresponding to the processing priority of the sub-regions;
    determining based on the step of processing the sub-regions whether one or more of the sale-regions contains decodable data;
    if it is determined that a sub-region contains decodable data, increasing the processing priority associated with said sub-region;
    assigning to each sub-region a numerical value expressed as a fraction of 100 such that the numerical values of the plurality of sub-regions total approximately 100 when added together, the numerical value assigned to each sub-region indicative of the processing priority associated with said sub-region; and if it is determined that a first sub-region contains decodable data and a second sub-region does not contain decodable data, increasing the numerical value associated with the first sub-region and decreasing the numerical value associated with the second sub-region so that the numerical values of the plurality of sub-regions total approximately 100 when added together.

11. The method of claim 1, further comprising:
if it is determined that a sub-region does not contain decodable data, maintaining the processing priority associated with said sub-region.

12. The method of claim 1, further comprising:
assigning to each sub-region a numerical value indicative of a processing priority associated with the respective sub-region;
assigning to each sub-region a weight indicative of a relative level of importance of processing the respective sub-region; and
calculating for each sub-region a weighted processing priority, the weighted processing priority calculated from a product of the numerical value associated with a sub-region and the corresponding weight associated with said sub-region,
wherein the processing order is defined based on the weighted processing priorities of the sub-regions.

13. The method of claim 1, further comprising:
after each sub-region is processed, determining whether said sub-region alone or in combination with one or more previously processed sub-regions contains decodable data corresponding to an entirety of the first optical code; and
if it is determined that said sub-region alone or in combination with one or more previously processed sub-regions contains decodable data corresponding to the entirety of the first optical code, terminating the step of processing the sub-regions according to the processing order so that any unprocessed sub-regions are not processed.

14. The method of claim 1, further comprising:
determining whether a processing priority of a sub-region falls below a pre-determined threshold; and
if it is determined that a processing priority of a sub-region falls below the pre-determined threshold, skipping the processing of said sub-region.

15. The method of claim 1 wherein it is determined that a sub-region contains decodable data if at least one valid character is identified.

16. A method of processing an optical code by a data reader, comprising the steps of:
acquiring an image of a first optical code within a scan volume of the data reader, the acquired image comprising a plurality of sub-regions;
receiving data corresponding to the plurality of sub-regions of the acquired image of the first optical code, wherein each sub-region has associated therewith a processing priority;
processing the sub-regions for decodable data corresponding to the first optical code in a processing order corresponding to the processing priority of the sub-regions;
determining based on the step of processing the sub-regions whether one or more of the sub-regions contains decodable data;
if it is determined that a sub-region contains decodable data, increasing the processing priority associated with said sub-region;
after the step of increasing the processing priority associated with the sub-region that contained decodable data, receiving data corresponding to a plurality of sub-regions of an acquired image of a second optical code; and
processing the sub-regions for decodable data corresponding to the second optical code according to the processing order, wherein the processing order reflects the increased processing priority associated with the sub-region of the acquired image of the first optical code that contained decodable data.

17. A machine-readable medium on which is stored computer program instructions for performing the method of processing an optical code according to claim 1.

18. A method of processing an optical code by a data reader, comprising the steps of:
acquiring a first image of the optical code;
extracting data from the first image corresponding to a plurality of sub-regions of the image;
determining a decoding order in which to attempt to decode data associated with each sub-region based on a predetermined indication of a likelihood of decoding each of the sub-regions, wherein a sub-region having a highest likelihood of decoding is decoded first and a sub-region having a lowest likelihood of decoding is decoded last;
processing according to the decoding order the data associated with each sub-region; and
for each sub-region that contains decodable data based on the step of processing the data associated with each sub-region, updating a respective indication of the likelihood of decoding the sub-region so that a decoding order of sub-regions of a subsequent image reflects which sub-regions of the first image contained decodable data.

19. The method of claim 18 wherein the sub-regions comprise virtual scan lines.

20. The method of claim 18 wherein at least one sub-region is not decoded based upon the likelihood of decoding said at least one sub-region.

21. A system for processing optical codes, comprising:
an image sensor that acquires an image of a target bearing an optical code within a field of view;
a memory for storing a processing priority list, the processing priority list defining an order in which to process a plurality of sub-regions of the image acquired; and
a processor in communication with the image sensor and the memory, the processor configured to:
cause the image sensor to acquire a first image of the target bearing the optical code within the field of view of the image sensor;
extract data from the acquired first image corresponding to the plurality of sub-regions;
process, according to the processing priority list stored in the memory, the plurality of sub-regions for decodable data corresponding to the optical code;
determine whether one or more of the plurality of sub-regions contains decodable data;
if it is determined that a sub-region contains decodable data, increase a processing priority associated with said sub-region and update the processing priority list stored in the memory to reflect the increase in the processing priority associated with said sub-region;
determine whether said sub-region alone or in combination with one or more previously processed sub-regions contains decodable data corresponding to an entirety of the optical code;
acquire a second image of the optical code;
receive data corresponding to the plurality of sub-regions in the second image of the optical code;

process the sub-regions of the second image for decodable data corresponding to the optical code according to the priority list stored in the memory, wherein the priority list reflects the increased processing priority associated with the sub-region from the acquired first image of the optical code that contained decodable data.

22. The system of claim 21 wherein the sub-regions comprise virtual scan lines.

23. The system of claim 21 wherein if it is determined that a sub-region does not contain decodable data the processor is further configured to maintain the processing priority associated with said sub-region.

24. The system of claim 21 wherein the processor is further configured to reset to a default value the processing priority associated with each sub-region after a predetermined period of time.

25. The system of claim 21 wherein each sub-region has assigned thereto a numerical value indicative of a processing priority associated with the respective sub-region, wherein each sub-region has assigned thereto a weight indicative of a relative level of importance of processing the respective sub-region, wherein the processor is further configured to calculate for each sub-region a weighted processing priority, the weighted processing priority calculated from a product of the numerical value associated with a sub-region and the corresponding weight associated with said sub-region, and wherein the order in which to process the plurality of sub-regions of an acquired image of an optical code defined by the processing priority list is determined based on the weighted processing priorities of the sub-regions.

* * * * *

UNITED STATES PATENT AND TRADEMARK OFFICE
CERTIFICATE OF CORRECTION

PATENT NO.       : 8,459,556 B2
APPLICATION NO.  : 12/652544
DATED            : June 11, 2013
INVENTOR(S)      : Welyang Zhou It is certified that error appears in the above-identified patent and that said Letters Patent is hereby corrected as shown below:

Specification

<u>Column 8</u>
Line 6, after "codewords" change "low" to --(i.e., low--.

<u>Column 12</u>
Line 24, after "may" insert --be--.

<u>Column 16</u>
Line 1, after "more" insert --of--.

Claims

<u>Column 19</u>
Line 57-58, claim 1 change "sub-relations" to --sub-regions--.

<u>Column 20</u>
Line 6, claim 2 after "volume" insert --of--.
Line 57, claim 10 change "sale-regions" to --sub-regions--.

Signed and Sealed this
Twenty-seventh Day of October, 2015

Michelle K. Lee
*Director of the United States Patent and Trademark Office*